United States Patent
Song et al.

(10) Patent No.: US 11,281,048 B2
(45) Date of Patent: Mar. 22, 2022

(54) DISPLAY PANEL, QUANTUM DOT LED BACKLIGHT SOURCE, AND PREPARATION METHOD THEREOF

(71) Applicant: HUIZHOU CHINA STAR OPTOELECTRONICS TECHNOLOGY CO., LTD., Guangdong (CN)

(72) Inventors: Lianyan Song, Guangdong (CN); Yongyuan Qiu, Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 277 days.

(21) Appl. No.: 16/608,770

(22) PCT Filed: Aug. 16, 2019

(86) PCT No.: PCT/CN2019/101013
§ 371 (c)(1),
(2) Date: Oct. 25, 2019

(87) PCT Pub. No.: WO2020/244055
PCT Pub. Date: Dec. 10, 2020

(65) Prior Publication Data
US 2021/0333637 A1    Oct. 28, 2021

(30) Foreign Application Priority Data
Jun. 3, 2019 (CN) .......................... 201910474724.2

(51) Int. Cl.
*G02F 1/1335*   (2006.01)
*G02F 1/13357*  (2006.01)

(52) U.S. Cl.
CPC .. *G02F 1/133607* (2021.01); *G02F 1/133603* (2013.01); *G02F 1/133606* (2013.01); *G02F 1/133608* (2013.01); *G02F 1/133614* (2021.01)

(58) Field of Classification Search
CPC ......... G02F 1/133603; G02F 1/133608; G02F 1/133607; G02F 1/133614; B32B 2307/412; B32B 2307/414; G02B 5/045
See application file for complete search history.

(56) References Cited

U.S. PATENT DOCUMENTS

2005/0069678 A1* 3/2005 Olczak ................ G02B 5/021
428/156
2009/0213464 A1* 8/2009 Kurachi .............. G02B 5/0242
359/599

(Continued)

FOREIGN PATENT DOCUMENTS

CN    102128391 A  *  7/2011  ....... G02F 1/133603
CN    104360425 A     2/2015
(Continued)

*Primary Examiner* — Erin Kryukova

(57) ABSTRACT

A quantum dot light emitting diode (LED) backlight source which includes a light source quantum dot diaphragm, a support diaphragm, and a prism sheet which are disposed sequentially. The light source quantum dot diaphragm includes a flexible printed circuit board, a mini light emitting diode layer, and a quantum dot film layer which are disposed sequentially. The mini light emitting diode layer includes a plurality of mini light emitting diodes spaced apart, the quantum dot film layer and the mini light emitting diode layer are bonded together.

9 Claims, 5 Drawing Sheets

(56) References Cited

U.S. PATENT DOCUMENTS

| | | | |
|---|---|---|---|
| 2015/0300576 A1* | 10/2015 | Matsuura | G02F 1/133606 |
| | | | 362/97.1 |
| 2016/0334078 A1 | 11/2016 | Wang et al. | |
| 2018/0036997 A1 | 2/2018 | Shimizu | |
| 2020/0285117 A1* | 9/2020 | Hashimoto | G02F 1/133603 |
| 2021/0181577 A1* | 6/2021 | Zha | G02F 1/133605 |
| | | | 349/64 |

FOREIGN PATENT DOCUMENTS

| | | |
|---|---|---|
| CN | 106597587 A | 4/2017 |
| CN | 107250848 A | 10/2017 |
| CN | 109212653 A | 1/2019 |
| CN | 109828408 A | 5/2019 |
| KR | 100844586 B1 | 7/2008 |

\* cited by examiner

DISPLAY PANEL, QUANTUM DOT LED BACKLIGHT SOURCE, AND PREPARATION METHOD THEREOF

FIELD OF INVENTION

The present disclosure relates to a display panel technology field, and particular to a quantum dot light emitting diode (LED) backlight source and a preparation method thereof.

BACKGROUND OF INVENTION

Mini light emitting diodes (mini-LEDs) are chip products having a chip size less than 200 um. The market uses mini-LEDs as a backlight source for a liquid-crystal display (LCD) display, because it can realize ultra-thinness, multi-partition and is a product using small-size chips, which can match OLED products in display effect, and material cost of mini-LEDs has more competitive advantages than material cost of organic light emitting diodes (OLEDs), so that the mini-LEDs are proposed to be used.

When mini-LEDs on the market are used as a backlight, they must be collocated with fluorescent powder to realize emittance of white light. In order to demonstrate a design requirement of a high-end model of mini-LEDs, generally a mini-LED product will be collocated with a quantum dot (QD) film to realize a high color gamut.

Due to low efficiency of the quantum dot film, the quantum dot film needs to be brightened with prisms. Although this type of form uses small size mini-LEDs to realize the design to be thin, it does not change the conventional backlight form, and there are still optical devices such as a light source, a diffusion plate, and an optical film in the backlight.

In the conventional mini-LED LCD backlight, the quantum dot film is separated from the light source, which is easy to cause occasions such as assembly failure of the quantum dot film, and when the quantum dot film is cut, peeling off is easy to occur.

Therefore, it is indeed necessary to develop a new type of a quantum dot LED backlight source to overcome defects of the prior art.

SUMMARY OF INVENTION

One purpose of the present disclosure is to provide a quantum dot LED backlight source which can solve problems such as assembly failure of the quantum dot film, and peeling off is easy to occur when the quantum dot film is cut.

In order to realize the purpose mentioned above, the present disclosure provides a quantum dot light emitting diode (LED) backlight source which includes a light source quantum dot diaphragm, a support diaphragm, and a prism sheet which are disposed sequentially; wherein the light source quantum dot diaphragm includes a flexible printed circuit board, a mini light emitting diode layer, and a quantum dot film layer which are disposed sequentially, the mini light emitting diode layer includes a plurality of mini light emitting diodes spaced apart, the quantum dot film layer and the mini light emitting diode layer are bonded together.

Further, in other embodiment, the light source quantum dot diaphragm, the support diaphragm, and the prism sheet are bonded together.

Further, in other embodiment, the prism sheet includes a first plastic film layer and a prism layer disposed on the first plastic film layer, and the prism layer includes a plurality of prisms spaced apart.

Further, in other embodiment, the support diaphragm includes a second plastic film layer and a support layer disposed on the second plastic film layer, and the support layer includes a plurality of support structures spaced apart.

Further, in other embodiment, a thickness of the first plastic film layer is less than a thickness of the support layer.

Further, in other embodiment, a distance between each of the support structures is greater than a distance between each of the prisms.

Further, in other embodiment, a cross section of the support structures includes a triangle shape, a semicircle shape, and a trapezoidal shape.

Further, in other embodiment, a cross section shape of the support structures includes a cylindrical shape, and a rectangular shape.

Another purpose of the present disclosure is to provide a preparation method for the quantum dot LED backlight source related to the present disclosure, which includes the following steps:

step S1: providing a flexible printed circuit board and mini light emitting diode, picking and placing the mini light emitting diodes on to the flexible printed circuit board to form a mini light emitting diode layer;

step S2: coating a quantum dot film layer;

step S3: plating a buffer layer on the light source quantum dot diaphragm to form a quantum dot film layer;

step S4: providing a first plastic film layer, and forming a prism layer on the first plastic film layer and forming a prism sheet;

step S5: providing a second plastic film layer, and forming a support layer on the second plastic film layer and forming a support diaphragm;

step S6: bonding the prism sheet and the support diaphragm together to form a bonding diaphragm;

step S7: bonding the light source quantum dot diaphragm and the bonding diaphragm together to form the quantum dot LED backlight source.

Further, in other embodiment, the buffer layer is plated on the quantum dot film layer by a magnetron sputtering method.

Relative to the prior art, the beneficial effect of the present disclosure is to provide a quantum dot LED backlight source and a preparation method thereof, which makes the mini light emitting diodes being integrated with the quantum dot film layer and the prisms, thereby realizing the backlight into one body, and facilitate for automated assembly, meanwhile, the quantum dot film layer and prism layer with a low refractive index can realize a function of light collection to perform brightening effect, thereby improving brightness of the backlight; on the other hand, realizes the backlight to be thin, thereby realizing the module to be thin.

DESCRIPTION OF DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which figures those skilled in the art can derive further figures without making any inventive efforts.

DETAILED DESCRIPTION OF PREFERRED EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

The specific structural and functional details disclosed are merely representative and are for the purpose of describing exemplary embodiments of the present disclosure. However, the present disclosure may be specifically implemented in many alternative forms and should not be construed as being limited only to the embodiments set forth herein.

The First Embodiment

Figure 1:
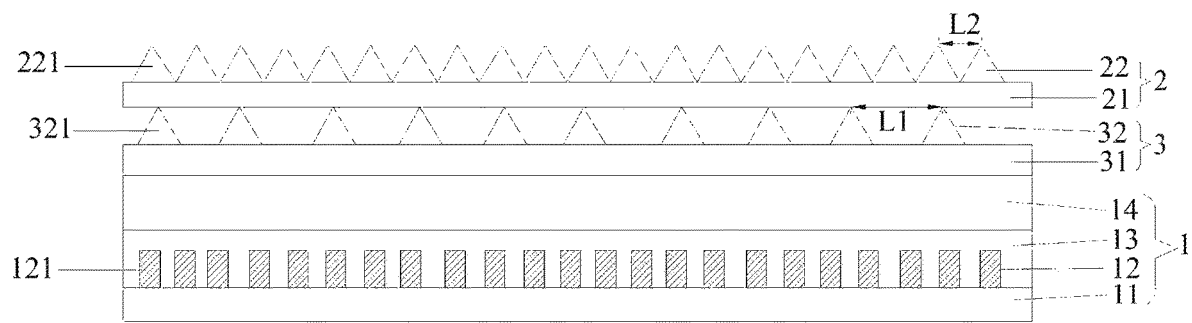
FIG. 1 is a structural schematic diagram of the quantum dot light emitting diode (LED) backlight source provided by the first embodiment of the present disclosure.

This embodiment provides a quantum dot light emitting diode (LED) backlight source. Please refer to FIG. 1, FIG. 1 is a structural schematic diagram of the quantum dot LED backlight source provided by this embodiment. The quantum dot LED backlight source includes a light source quantum dot diaphragm 1, a support diaphragm 3, and a prism sheet 2 which are disposed sequentially. The light source quantum dot diaphragm 1, the support diaphragm 3, and the prism sheet 2 are bonded together.

The light source quantum dot diaphragm 1 includes a flexible printed circuit board 11, a mini light emitting diode layer 12 disposed on the flexible printed circuit board 11, a quantum dot film layer 13 disposed on the mini light emitting diode layer 12, and a buffer layer 14 disposed on the quantum dot film layer 13. The buffer layer 14 have a function of blocking water and oxygen.

The mini light emitting diode layer 12 includes a plurality of mini light emitting diodes 121 spaced apart, and the quantum dot film layer 13 and the mini light emitting diode layer 12 are bonded together.

The mini light emitting diode layer is integrated with the quantum dot film layer and the prisms, thereby realizing the backlight into one body, and facilitate for automated assembly; on the other hand, realizes the backlight to be thin, thereby realizing the module to be thin.

The quantum dot film layer 13 includes a plurality of quantum dots dispersed in the quantum dot film layer, and the quantum dots include red quantum dots and green quantum dots.

The prism sheet includes a first plastic film layer 21 and a prism layer 22 disposed on the first plastic film layer 21, and the prism layer 22 includes a plurality of prisms 221 spaced apart, and a distance between each of the prisms 221 is L2.

A cross section of the prisms 221 is triangle, and the first plastic film layer 21 can carry the prism layer 22 on the first plastic film layer 21.

The support diaphragm 3 includes a second plastic film layer 31 and a support layer 32 disposed on the second plastic film layer 31, and the support layer includes a plurality of support structures 321 spaced apart, and a distance between each of the support structures 321 is L1.

A cross section of the support structures 321 is triangle, and the second plastic film layer 31 can carry the support layer 32 on the second plastic film layer 31.

In order to ensure that the prism layer 22 has a function of light collection and brightening, the distance L1 between each of the support structures 321 is greater than the distance L2 between each of the prisms 221, and a thickness of the first plastic film layer 21 is less than a thickness of the support layer 32.

In other embodiments, the cross section of the support structures 321 is not limited to be a triangular shape, and may be a semicircular shape, a trapezoidal shape, a cylindrical shape, or a rectangular shape, can be determined by requirement, and is not limited herein.

This embodiment further provides a display panel, which includes a body, the quantum dot LED backlight source related to this embodiment is disposed on the body.

The Second Embodiment

Figure 2:
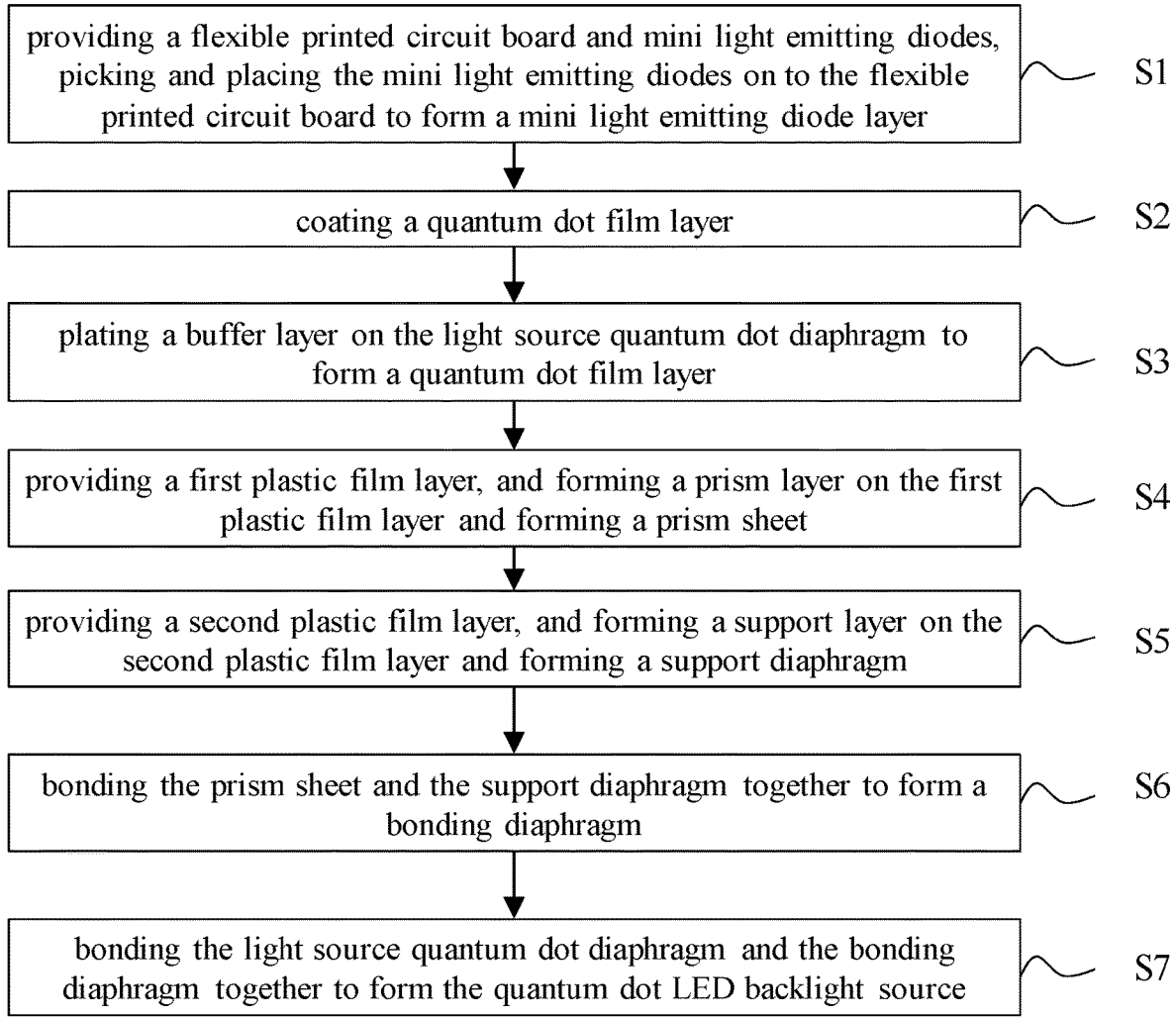
FIG. 2 is a flowchart of the preparation method for the quantum dot LED backlight source provided by the second embodiment of the present disclosure.

This embodiment provides a method for preparing the quantum dot LED backlight source related to the first embodiment. Please refer to FIG. 2, FIG. 2 is a flowchart of the preparation method for the quantum dot LED backlight source provided by this embodiment, which includes the following steps:

Step S1: providing a flexible printed circuit board 11 and mini light emitting diodes 121, picking and placing the mini light emitting diodes 121 on to the flexible printed circuit board 11 to form a mini light emitting diode layer 12.

Figure 3:
FIG. 3 is a structural schematic diagram of the quantum dot LED backlight source of the step S1 in the preparation method provided by the second embodiment of the present disclosure.

Please refer to FIG. 3, FIG. 3 is a structural schematic diagram of the quantum dot LED backlight source of the step S1 in the preparation method provided by this embodiment.

Step S2: coating a quantum dot film layer 13.

Figure 4:
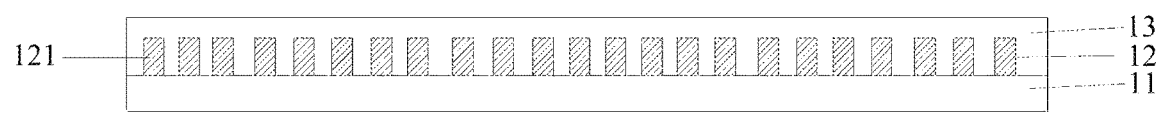
FIG. 4 is a structural schematic diagram of the quantum dot LED backlight source of the step S2 in the preparation method provided by the second embodiment of the present disclosure.

Please refer to FIG. 4, FIG. 4 is a structural schematic diagram of the quantum dot LED backlight source of the step S2 in the preparation method provided by this embodiment.

The quantum dot film layer 13 includes a plurality of quantum dots dispersed in the quantum dot film layer, and the quantum dots include red quantum dots and green quantum dots.

Step S3: plating a buffer layer 14 on the light source quantum dot diaphragm 13 to form a quantum dot film layer 1.

Figure 5:
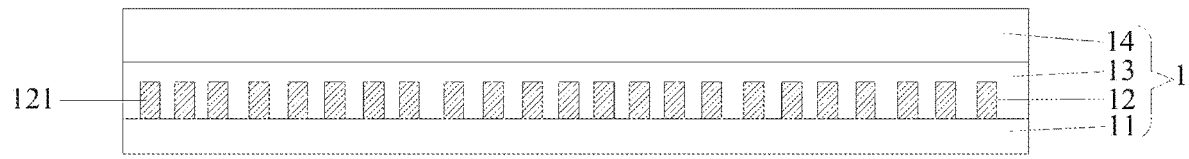
FIG. 5 is a structural schematic diagram of the quantum dot LED backlight source of the step S3 in the preparation method provided by the second embodiment of the present disclosure.

Please refer to FIG. 5, FIG. 5 is a structural schematic diagram of the quantum dot LED backlight source of the step S3 in the preparation method provided by this embodiment.

The buffer layer 14 is plated on the quantum dot film layer 13 by a magnetron sputtering method, and the buffer layer 14 have a function of blocking water and oxygen.

Step S4: providing a first plastic film layer 21, and forming a prism layer 22 on the first plastic film layer 21 and forming a prism sheet 2.

Figure 6:
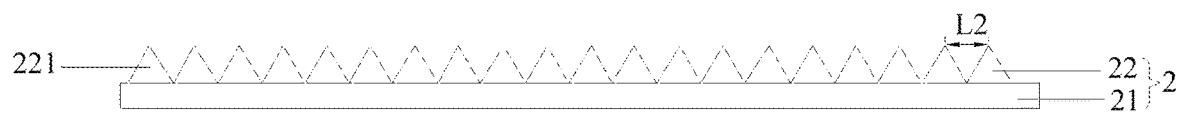
FIG. 6 is a structural schematic diagram of the quantum dot LED backlight source of the step S4 in the preparation method provided by the second embodiment of the present disclosure.

Please refer to FIG. 6, FIG. 6 is a structural schematic diagram of the quantum dot LED backlight source of the step S4 in the preparation method provided by this embodiment.

The prism layer 22 includes a plurality of prisms 221 spaced apart, and a distance between each of the prisms is L2.

A cross section of the prisms 221 is triangle, and the first plastic film layer 21 can carry the prism layer 22 on the first plastic film layer 21.

Step S5: providing a second plastic film layer 31, and forming a support layer 32 on the second plastic film layer 31 and forming a support diaphragm 3.

Figure 7:
FIG. 7 is a structural schematic diagram of the quantum dot LED backlight source of the step S5 in the preparation method provided by the second embodiment of the present disclosure.

Please refer to FIG. 7, FIG. 7 is a structural schematic diagram of the quantum dot LED backlight source of the step S5 in the preparation method provided by this embodiment.

The support layer includes a plurality of support structures 321 spaced apart, and a distance between each of the support structures 321 is L1.

A cross section of the support structures 321 is triangle, and the second plastic film layer 31 can carry the support layer 32 on the second plastic film layer 31.

Step S6: bonding the prism sheet 2 and the support diaphragm 4 together to form a bonding diaphragm 4.

Figure 8:
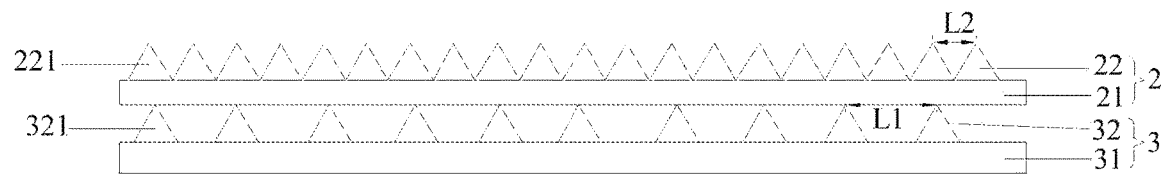
FIG. 8 is a structural schematic diagram of the quantum dot LED backlight source of the step S6 in the preparation method provided by the second embodiment of the present disclosure.

Please refer to FIG. 8, FIG. 8 is a structural schematic diagram of the quantum dot LED backlight source of the step S6 in the preparation method provided by this embodiment.

In order to ensure that the prism layer 22 has a function of light collection and brightening, the distance L1 between each of the support structures 321 is greater than the distance L2 between each of the prisms 221, and a thickness of the first plastic film layer 21 is less than a thickness of the support layer 32.

In other embodiments, the cross section of the support structures 321 is not limited to a triangular shape, and may be a semicircular shape, a trapezoidal shape, a cylindrical shape, or a rectangular shape, can be determined by requirement, and is not limited herein.

Step S7: bonding the light source quantum dot diaphragm 1 and the bonding diaphragm 4 together to form the quantum dot LED backlight source.

Figure 9:
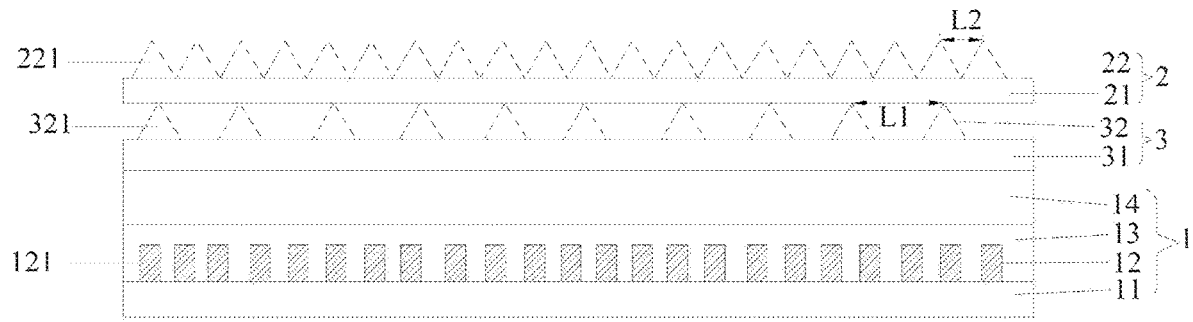
FIG. 9 is a structural schematic diagram of the quantum dot LED backlight source of the step S7 in the preparation method provided by the second embodiment of the present disclosure.

Please refer to FIG. 9, FIG. 9 is a structural schematic diagram of the quantum dot LED backlight source of the step S7 in the preparation method provided by this embodiment.

The beneficial effect of the present disclosure is to provide a quantum dot LED backlight source and a preparation method thereof, which makes the mini light emitting diodes being integrated with the quantum dot film layer and the prisms, thereby realizing the backlight into one body, and facilitate for automated assembly, meanwhile, the quantum dot film layer and prism layer with a low refractive index can realize a function of light collection to perform brightening effect, thereby improving brightness of the backlight; on the other hand, realizes the backlight to be thin, thereby realizing the module to be thin.

Which mentioned above is preferred embodiments of the present disclosure, it should be noted that to those skilled in the art without departing from the technical theory of the present disclosure, can further make many changes and modifications, and the changes and the modifications should be considered as the scope of protection of the present disclosure.

What is claimed is:

1. A preparation method for preparing a quantum dot light emitting diode (LED) backlight source, comprising:
    step S1: providing a flexible printed circuit board and mini light emitting diodes, picking and placing the mini light emitting diodes on to the flexible printed circuit board to form a mini light emitting diode layer;
    step S2: coating a quantum dot film layer on the mini light emitting diode layer;
    step S3: plating a buffer layer on the quantum dot film layer, thereby forming a light source quantum dot diaphragm;
    step S4: providing a first plastic film layer and forming a prism layer on the first plastic film layer, thereby forming a prism sheet;
    step S5: providing a second plastic film layer and forming a support layer on the second plastic film layer, thereby forming a support diaphragm;
    step S6: bonding the prism sheet and the support diaphragm together to form a bonding diaphragm;
    step S7: bonding the light source quantum dot diaphragm and the bonding diaphragm together to form the quantum dot LED backlight source.

2. The preparation method as claimed in claim 1, wherein the buffer layer is plated on the quantum dot film layer by a magnetron sputtering method.

3. The preparation method as claimed in claim 1, wherein the mini light emitting diodes are spaced apart, the quantum dot film layer and the mini light emitting diode layer are bonded together.

4. The preparation method as claimed in claim 3, wherein the light source quantum dot diaphragm, the support diaphragm, and the prism sheet are bonded together.

5. The preparation method as claimed in claim 1, wherein the prism layer comprises a plurality of prisms spaced apart.

6. The preparation method as claimed in claim 5, wherein the support layer comprises a plurality of support structures spaced apart.

7. The preparation method as claimed in claim 6, wherein a distance between each of the support structures is greater than a distance between each of the prisms.

8. The preparation method as claimed in claim 6, wherein a cross section shape of the support structures comprises a triangle shape.

9. The preparation method as claimed in claim 3, wherein the quantum dot light LED backlight source is disposed on a body of a display panel.

* * * * *